July 20, 1943.  J. P. O'CONNOR  2,324,799
AUTOMATIC MEANS FOR CONTROLLING SLIDING MEMBERS
Filed March 27, 1942  2 Sheets-Sheet 1
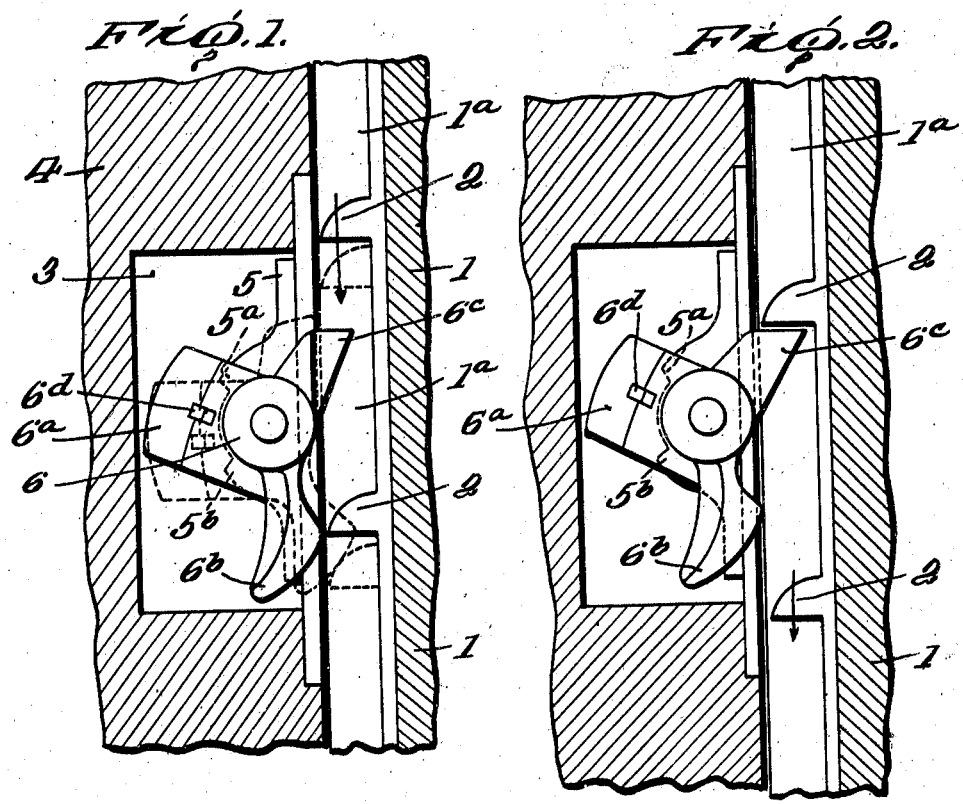
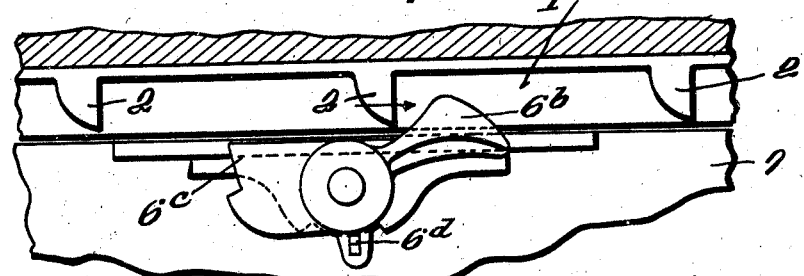
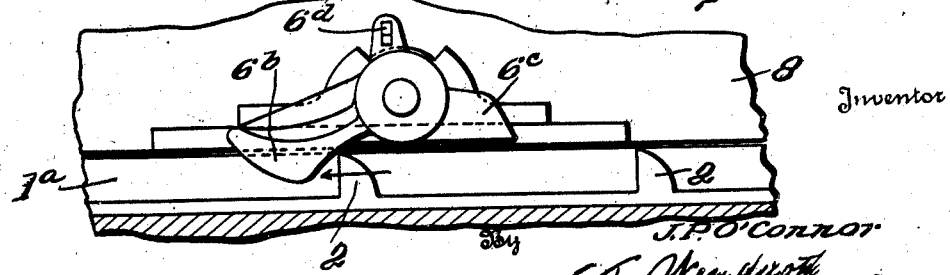
Inventor
J. P. O'Connor
Attorney

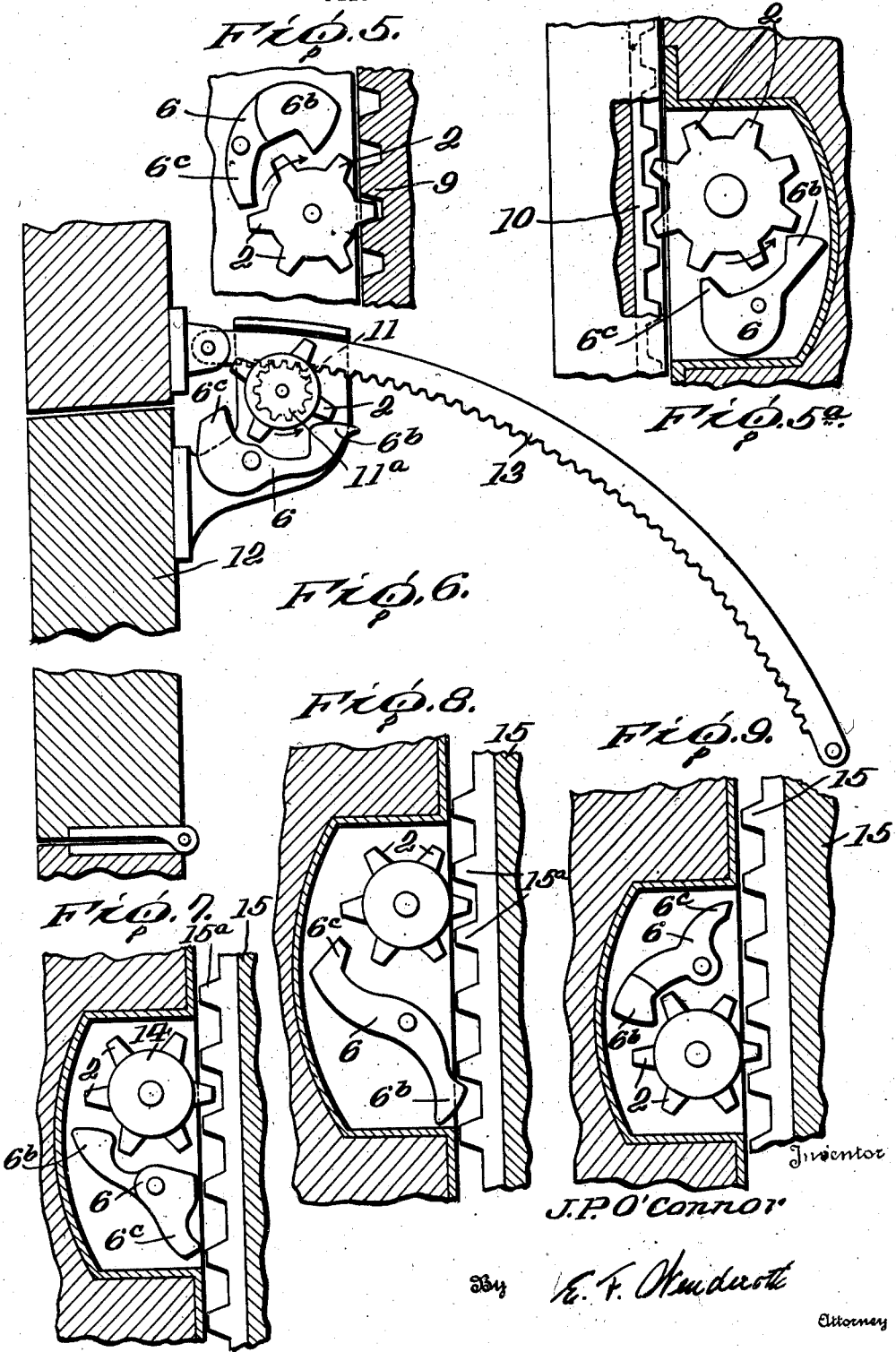

Patented July 20, 1943

2,324,799

UNITED STATES PATENT OFFICE 2,324,799

AUTOMATIC MEANS FOR CONTROLLING SLIDING MEMBERS

James Philip O'Connor, Dublin, Eire

Application March 27, 1942, Serial No. 436,509
In Eire March 5, 1941

7 Claims. (Cl. 292—195)

This invention relates to the controlling of sliding members, either sliding vertically, horizontally or otherwise and which sliding members may be used for various purposes and may form parts of various articles. As examples the sliding member may be a window, shutter or door, a sliding part or parts of furniture, ladders etc. The object of the invention is to provide automatic control means simple in construction, positive and efficient in action and adapted to dispense with the use of hand operated locking or holding devices or, in the case of windows and the like, to dispense with the use of weights, pulleys and cords.

According to the invention the movement of a sliding member in one direction is controlled by locking or holding means consisting of a gravity controlled pivoted rocking member comprising a pawl and cam so supported in relation to spaced projections and having its shape and weight so disposed in relation to its pivot; and the relative positions of the pawl, cam and pivot in relation to the distance between the spaced projections such that as the sliding member is moved in one direction, the spaced projections will co-operate with the cam of the rocking member to turn same and move the pawl thereof into the path of the spaced projections due to gravity action normally causing the cam to lie in the path of the spaced projections and when not in contact therewith the cam will, by gravity action turn the rocking member about its pivot to move the pawl out of the path of the spaced projections, the distance between the pawl and cam and the pivot of the rocking member, the distance between the spaced projections and the rate of travel of the sliding member determining the position of the pawl in relation to the next spaced projection and whether the pawl will be engaged thereby to hold and lock the sliding member or be clear of the projection so that the sliding member can continue its movement. The cam has leading and trailing faces, the leading face usually being either straight and flat or slightly concave, while the trailing face is usually convex. The locking or control means allows free movement of the sliding member in a direction opposite to that in which it is controlled as described.

The rocking member may be located on the sliding member and the spaced projections on a stationary member or alternatively the rocking member may be on a stationary member and the spaced projections on the sliding member, the co-operative action between the rocking member and the spaced projections being essentially the same in both cases. The spaced projections may be arranged in a straight line or in curved formation which may take the form of spaced projections on a wheel or of a series of spaced projections in segmental formation, the co-operative action between the rocking member and the spaced projections being essentially the same whether the latter are arranged in a straight line or in curved formation. The member on which are the projections is hereinafter, for convenience, broadly termed a rack, it being understood, however, that the term "rack" is used in its broader or general, rather than its restrictive sense; I also refer to the element carrying the projections by the general term "member." The control means may be applied to vertically sliding members and it will readily be understood that the said means can also be applied to horizontally or angularly movable sliding members. The sliding member may in the case of horizontally or angularly sliding members be above or below the rocking member which may be modified to suit action in such position and with its weight disposed to ensure the desired action for example when the sliding member is located above the rocking member the weight would be mainly at the pawl end to normally hold the pawl clear of the projections with the cam normally in the path of the projections with the result already described when the sliding member is moved slowly or quickly. When the sliding member is below the rocking member the arrangement and action is the same or similar to that provided for a vertically sliding member.

It is to be understood that the term "spaced projections" means any solid parts between spaced gaps and, for example, instead of toothlike projections the spaced projections may be the solid intervals between a series of holes or recesses in a straight or curved member.

Some examples of carrying the invention into effect will now be described with reference to the accompanying drawings wherein:

Figs. 1 and 2 show in elevation the application of the invention to a sliding window sash and showing different positions of the rocking member and spaced projections as hereinafter described.

Fig. 3 shows in elevation an example of horizontally arranged members relatively movable and controlled as to movement in one direction by the locking means as arranged for operation when the spaced projections are above the rocking member.

Fig. 4 also shows in elevation an example of horizontally arranged members relatively movable and controlled as to movement in one direction by the locking means but arranged for operation when the spaced projections are below the rocking member.

Figs. 5 and 5a show in elevation examples of the spaced projections arranged on the periphery of a wheel, the controlled spaced projections on the wheel in this case serving to control relative movement in one direction between a rack and the member carrying the wheel and rocker.

Fig. 6 shows in elevation how the invention may be applied to the control of movement of a hinged fanlight slidably supported at its top on a curved rack or quadrant as hereinafter described.

Fig. 7 shows in elevation an example in which the member carrying the rocker is slidable relatively to a fixed rack or series of spaced projections and in which the cam of the rocker is acted on by spaced projections on the periphery of a wheel which moves with the rocker whilst the pawl of the rocker acts on the fixed projections or rack.

Fig. 8 is another example in which the member carrying the rocker is slidable relatively to a fixed rack or series of spaced projections but in this case the cam of the rocker is controlled by the spaced projections on the rack and the pawl controls movement of the spaced projections on the wheel which in turn controls movement in one direction of the sliding member carrying the rocker and wheel relatively to the fixed rack.

Fig. 9 is an example in which the rocker and its co-operating wheel of spaced projections are fixed and the rack is movable, the cam of the rocker in this case is shown controlled by the projections on the wheel whilst the pawl of the rocker co-operates with the spaced projections of the sliding rack.

In these drawings all the examples are shown in elevation with parts in section where necessary for clearness, and it will be understood that the thickness of the rocker will vary with requirements and that the shape of the rocker will vary, as regards the balance of the rocker, from the examples shown, in accordance with requirements and in regard to whether it is to control members with relative movement vertically, horizontally or at intermediate angles and also in regard to whether the rocker is to operate above or below the spaced projections.

I will now more particularly describe the invention with reference to these drawings.

In the example shown at Figs. 1 and 2, the invention is shown applied to the controlling of movement in one direction of a vertically slidable window sash. The window sash 1 has a series of spaced projections 2 in the form of a rack located in a groove 1a in the side of the sash. In a housing 3 sunk in the side of the window frame 4 and turnably supported in bearings on a bracket 5 is a rocking member or rocker 6 having a projection or pawl 6c at the top thereof and a projecting cam 6b at the lower end thereof, the rocker being weighted at 6a so that, by gravity action the cam 6b normally lies in the recess or groove 1a in the path of movement of the spaced projections 2. The latter are so spaced, the distance between the cam 6b and the pawl 6c and the shape of the cam and pawl are such that when the sash 1 is lowered at less than a predetermined speed the projections 2 as they descend and pass the cam 6b will act on the upper or leading, substantially straight and flat surface of the cam to cause it to turn the pawl 6c into the groove 1a as shown in full lines at Fig. 1 and as the lower projection 2 shown proceeds downwards the underside or convex surface of the cam 6b will slide over the top of the projection 2 and will move into the groove 1a as shown by the dotted lines in Fig. 1 thereby moving the pawl 6c out of the groove 1a and allowing the next projection 2 to pass downwards without interference from the pawl 6c. If however the sash 1 is lowered at or above the predetermined speed the cam 6b will not have time to so move into the groove 1a as to take the pawl 6c out of the groove, with the result that the projection 2 approaching the pawl 6c will contact with and will pull in the pawl and will be held by the pawl as shown at Fig. 2. The locking action of the pawl on the rack can be released by slightly raising the sash 1 so that the cam 6b swings again into the groove 1a and takes the pawl 6c clear of the groove whereupon the sash can be slowly lowered if desired. Upwards movement of the sash 1 is free from any locking action by the pawl 6c. A stopper 6d is shown provided on the rocker 6 and corresponding stops 5a and 5b are provided on the bracket 5 to limit the rocking movement of the rocker 6. The cam 6b and projection 2 may be said to be substantially of complementary toe-like contour, cam 6b having a leading, straight and flat face, and a trailing convex face. By leading face is meant the face of the cam which, when the sash 1 is being lowered, first contacts the cooperating projection 2.

In the example shown at Fig. 3 the projections 2 are located above the rocker 6 and the pawl 6c is weighted in order normally to locate the cam 6b in the groove 1a, so that the co-operative locking action between the rocker 6 and the projections 2 will be essentially the same as described with reference to Figs. 1 and 2. In this case it is immaterial whether the rack or projection carrying member slides relatively to the member 7 supporting the rocker 6 or vice versa.

In the example shown at Fig. 4 the projections 2 are located below the rocker 6 and the cam 6b is weighted so as normally to locate it in the groove 1a so that the co-operative locking action between the rocker 6 and the projections 2 will be essentially the same as described with reference to Figs. 1 and 2. In this case also it is immaterial whether the rack or projection carrying member slides relatively to the member 8 supporting the rocker or vice versa. Examples, Figs. 3 and 4 will also work at any angle between the horizontal positions shown and the vertical position, but as the vertical position is approached it may be necessary to modify the balance of the rocker to ensure the desired co-operative locking action between the rocker and the spaced projections.

In the example shown at Fig. 5 the spaced projections 2 are arranged in curved formation on the periphery of a wheel and the rocker 6 is modified in shape and location to suit with its cam 6b normally held in the path of the projections 2 due to the preponderance of weight at the cam 6b. At Fig. 5a the rocker 6 is shown arranged below the wheel of spaced projections 2, the rocker 6 being modified accordingly so that, in this case the preponderance of weight is at the pawl end of the rocker in order normally to keep the cam 6b in the path of the projection 2. The arrows in Figs. 5 and 5a show the direction of movement of the spaced projections relatively to the rocker so that they will control the cam 6b and, through the medium of the rocker, be controlled thereby when the speed of rotation in the direction indicated exceeds the predetermined permissible speed which will avoid interference with the movement of the spaced projections relatively to the rocker. In these cases the wheel of spaced projections is mounted on the same support as the rocker and the control of movement in one direction of a relatively slidable member (the racks 9 or 10) is effected by the projections on the wheels meshing with corresponding projections on the racks. An example of the use of a wheel member with the spaced projections thereon and controlled as described with reference to Figs. 5 and 5a may be given as in the case of a vertically slidable window sash or the like where a vertical rack 9 or 10 or equivalent spaced projections may be secured to the side of the sash whilst on the inner side of the window frame there is turnably supported a wheel with the suitably spaced projections thereon engaging corresponding projections on the rack and adapted to be controlled by a rocking member operating as hereinbefore described and also suitably supported on the window frame. Alternatively the rack or equivalent may be secured on the window frame and the wheel with the spaced projections and co-operating rocking control member secured to the window sash. These control devices may be arranged on the faces of the sash and frame and thus avoid recessing the window frame and sash to receive same. In these examples the rocker support may be stationary and the rack movable relatively thereto or vice versa.

An example of the usefulness of the rocker in accordance with the invention controlling spaced projections arranged in curved formation as on a wheel is shown in Fig. 6. In this case the rocker 6 and the wheel 11 carrying spaced projections 2 are mounted on that part of a fanlight 12 which slides relatively to a rack-like quadrant 13 supporting the top of the fanlight 12, a toothed wheel 11a on the wheel 11 engaging the teeth of the quadrant 13. The top of the fanlight 12 can be moved slowly down the quadrant 13 without interference from the rocker 6 but a quick or sharp downward movement will bring the locking control into action to stop such downward movement and lock the fanlight on the quadrant. It is thus possible by a sharp downward pull to lock the fanlight at any desired open position and it can, when necessary, be released by a slight upward movement if it is desired to move it to a new open position or, to shut it if desired. Upward movement of the fanlight top is not restricted in any way by the locking means.

In the case of a wheel member carrying suitably spaced projections 2 used to co-operate with a rocking member to control movement in one direction of, or relatively to, a member having suitably spaced projections thereon (which may be referred to as the rack) it may be advantageous so to shape the rocking member and so support and locate the pivot of the rocking member and also to interengage the wheel member directly or indirectly through the medium of another toothed wheel member, with the projections 15a on the rack that, as shown in Fig. 7, the cam 6b of the rocking member 6 will be acted on by the spaced projections 2 on the wheel 14 whilst the pawl 6c of the rocking member co-operates, under control of the cam, with the spaced projections 15a of the rack 15, to effect control of relative movement, in one direction, between the rack and the member supporting the wheel and rocker. It may alternatively be arranged as shown in Fig. 8 to have the cam 6b of the rocker co-operating with the spaced projections 15a of the rack 15 to control the pawl's engagement with and control of the movement, in one direction, of the spaced projections on the wheel member to effect control of relative movement in one direction between the rack and the member supporting the wheel and rocker.

Fig. 9 shows an arrangement similar to Fig. 7 but in this case the rocker is arranged above the wheel of spaced projections. In Fig. 7 the arrangement provides control of downward movement of the member supporting the wheel and rocker relatively to the rack whilst at Fig. 9 the arrangement provides for control of downward movement of the rack relatively to the rocker and wheel. Fig. 8 is arranged to provide for control of movement in one direction of the member supporting the rocker and wheel relatively to a fixed rack.

The control means hereinbefore described are cheap to make and fit and safe in action as a sliding member so controlled cannot slam or be slammed or move accidentally since a quick fall or quick movement causes the stop means to operate immediately. The control means may be fitted on one or both sides of a sliding member but usually one side would be sufficient.

What I claim is:

1. In combination, a member having spaced projections thereon, and a gravity-controlled pivoted rocking member cooperating with and movable relative to said first member, a bracket, said second member comprising a rocker rotatable to limited extent on said bracket, a pawl means, a cam part, and a counterweight means forming part of said rocker, said rocker being positioned so that its cam part, under gravity action of the counterweight means, contacts said spaced projections upon relative movement of the two members, and said cam part and projections having complementary generally toe-like contours, the cam part having leading and trailing faces, one substantially straight and flat and the other convex, the projection which in one direction of relative movement of the two members momentarily is opposite the cam part, first contacting the leading face thereof and forcing the latter about its pivot to rock the pawl means into the path of the next succeeding projection, and thereafter contacting the trailing face of the cam part, tending to permit the pawl means to rock in the opposite direction, out of the path of the said next succeeding projection, said projections being spaced apart a distance sufficient to permit the pawl means, during slow relative movement of the members, to be restored to position out of the path of the projections, but insufficient, when the relative movement exceeds a predetermined rate, to permit, due to inertia, removal of the pawl means from the path of the next projection before engagement therewith.

2. Apparatus for controlling relative movement between two cooperating members, one of which members has a frame, and an elongated rack on the other said member, said rack having spaced projections thereon, said apparatus comprising a housing in said frame, a bracket in said housing, a gravity-controlled rocker pivotally mounted for limited rotation on said bracket, and including a pawl means, a cam part, and a counterweight means, said cam part and projections having complementary generally toe-like contours, the cam part having leading and trailing faces, one substantially straight and flat and the other convex, said rocker being so positioned in said housing relative to said rack that upon relative movement of the two members the cam part, under the gravity action of the counterweight means, contacts said spaced projections, the projections in one direction of relative movement of the two members slipping said cam part without actuating the rocker, but actuating the same in the opposite direction of such relative movement, that projection which in the rocker-actuating direction of relative movement of the two members momentarily is opposite the cam part being adapted first to contact the leading face thereof to force the latter about its pivot and thereby rock the pawl means into the path of the next succeeding projection and thereafter to contact the trailing face of the cam part, tending to permit the pawl means to rock in the opposite direction, out of the path of the said next succeeding projection, said projections being spaced apart a distance sufficient to permit the pawl means, during slow relative movement of the members, to be restored to position out of the path of the projections, but insufficient, when the relative movement exceeds a predetermined rate, to permit, due to inertia, removal of the pawl means from the path of the next projection before engagement therewith.

3. Apparatus for controlling the relative movement between two cooperating members, the first said member having thereon a number of spaced projections, said apparatus comprising a housing set into the second said member, a rocker pivotally movable to a limited extent in the second member and comprising a pawl means, a cam part, and a counterweight means, the rocker being positioned in said housing so that the counterweight means normally forces the cam part into the path of the spaced projections, the cam part contacting the latter upon relative movement of the two members, the projections, in one direction of relative movement of the two members, slipping said cam part without actuating the rocker, each projection being substantially flat on one surface thereof and convex on its other face, in toe-like manner, and the said cam part having a leading, substantially straight and flat face and a trailing convex face, the cam part having toe-like configuration complementary to that of the projection, operable contact occurring, upon movement in the opposite direction of the members, between the operable edge of that projection momentarily opposite the cam part and the leading face of the latter, the rocker thus being forced upon its pivot to move the pawl means into the path of the next succeeding projection, further relative movement bringing the convex face of the projection into contact with the convex face of the cam part tending to permit the pawl means to rock in the opposite direction, out of the path of the said next succeeding projection, said projections being spaced apart a distance sufficient to permit, during slow relative movement of the members, the pawl means to be restored to position out of the path of the projections, but insufficient, when the relative movement exceeds a predetermined rate, to permit, due to inertia, removal of the pawl means from the path of the next projection before engagement therewith.

4. In combination, a frame, an elongated rack having spaced projections thereon and movable relative to said frame, a housing in said frame adjacent said rack, a bracket extending transversely of said housing, a rocker mounted for limited rotation on said bracket, having a cam part and a pawl means disposed near opposite ends thereof, counterweight means disposed centrally and rearwardly of said rocker and normally urging said cam part forwardly of said bracket, said bracket being so positioned that the cam part of the rocker, when moved forwardly by the counterweight means, comes into the path of the said projections, and said cam part and projections having complementary generally toe-like contours, the cam part having leading and trailing faces, one substantially straight and flat and the other convex, the projection which in one direction of relative movement of the two members momentarily is opposite the cam part, first contacting the leading face thereof and forcing the latter about its pivot to rock the pawl means into the path of the next succeeding projection and thereafter contacting the trailing face of the cam part, tending to permit the pawl means to rock in the opposite direction, out of the path of the said next succeeding projection, said projections being spaced apart a distance sufficient to permit the pawl means, during slow relative movement of the members, to be restored to position out of the path of the projections, but insufficient, when the relative movement exceeds a predetermined rate, to permit, due to inertia, removal of the pawl means from the path of the next projection before engagement therewith.

5. In combination, a frame, an elongated rack having spaced projections thereon and movable relative to said frame, a housing in the said frame adjacent said rack, a support bracket in said housing, a rocker disposed for limited rotation on said bracket, a cam part and a pawl means on said rocker adjacent opposite ends thereof, counterweight means also on said rocker tending to rock the latter so that the cam part normally extends outwardly of said housing into the path of the said rack, cooperating stops on said rocker and bracket for limiting the rotation of said rocker in each direction of rotation, said cam part and projections having complementary generally toe-like contours, the cam part having leading and trailing faces, one substantially straight and flat and the other convex, said cam part contacting said spaced projections upon relative movement of the two members, that projection which in one direction of relative movement of the two members momentarily is opposite the cam part first contacting the leading face thereof and forcing the latter about its pivot to rock the pawl means into the path of the next succeeding projection, and thereafter contacting the trailing face of the cam part, tending to permit the pawl means to rock in the opposite direction, out of the path of the said next succeeding projection, said projections being spaced apart sufficient distance to permit the pawl means, during slow relative movement of the members, to be restored to position out of the path of the projections, but insufficient, when the relative movement exceeds a predetermined rate, to permit, due to inertia, removal of the pawl means from the path of the next projection before engagement therewith.

6. The combination of a fixed frame, a rack having spaced projections extending toward said frame, and mounted on a movable window sash, a housing disposed in said frame and opening adjacent said rack, a rocker mounted for limited rotation in said housing and having a pawl means and a cam part adjacent opposite ends thereof, and adapted to be rocked selectively into the path of the said projections, counterweight means on said rocker normally tending to move said rocker to bring the cam part into the path of the projections, said cam part and projections having complementary generally toe-like contours, the cam part having leading and trailing faces, one substantially straight and flat and the other convex, the said rocker being inactive upon upward movement of the rack, the projection which in the downward direction of movement of the rack momentarily is opposite the cam part first contacting the leading face thereof and forcing the latter about its pivot to rock the pawl means into the path of the next succeeding projection, and thereafter contacting the trailing face of the cam part, tending to permit the pawl means to rock in the opposite direction, out of the path of the said next succeeding projection, said projections being spaced apart a distance sufficient to permit the pawl means, during slow downward movement of the rack, to be restored to position out of the path of the projections, but insufficient, when the relative movement exceeds a predetermined rate, to permit, due to inertia, removal of the pawl means from the path of the next projection before engagement therewith.

7. In combination, a stationary frame, a swingable closure pivotally connected thereto, a segmental toothed rack pivotally mounted on and swingable outwardly of said frame, a bracket on the exterior of said closure, a circular member rotatably mounted on said bracket and having outwardly extending, spaced projections, a pinion fast to said rotatable member and meshing with the teeth of said rack, a rocker pivotally mounted on said bracket and having thereon counterweight means, and a pawl means and a cam part disposed near opposite ends thereof, the counterweight means normally swinging the pawl means out of the path of the projections of the circular member, the contour of the cam part being such that the rocker is inactive in the closing movement of the closure member, the cam part and projections having complementary generally toe-like contours, the cam part having leading substantially straight and flat and trailing convex faces, that projection which in the opening movement of the closure member momentarily is opposite the cam part first contacting the leading face thereof and forcing the latter about its pivot to rock the pawl means into the path of the next succeeding projection, and thereafter contacting the trailing face of the cam part, tending to permit the pawl means to rock in the opposite direction, out of the path of the next succeeding projection, said projections being spaced apart a distance sufficient to permit the pawl means, during slow movement of the closure member, to be restored to position out of the path of the projections, but insufficient, when movement of the closure member exceeds a predetermined rate to permit, due to inertia, removal of the pawl means from the path of the next projection before engagement therewith, rotation of the projection-carrying member causing rotation of the pinion and movement of the latter along said rack.

JAMES PHILIP O'CONNOR.